US011145117B2

(12) United States Patent
Smith et al.

(10) Patent No.: US 11,145,117 B2
(45) Date of Patent: Oct. 12, 2021

(54) SYSTEM AND METHOD FOR PRESERVING A CONFIGURABLE AUGMENTED REALITY EXPERIENCE

(71) Applicant: AT&T Intellectual Property I, L.P., Atlanta, GA (US)

(72) Inventors: Barry A. Smith, Los Angeles, CA (US); Julian Volyn, Playa Del Ray, CA (US); Andrew Jonez, North Hollywood, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/699,972

(22) Filed: Dec. 2, 2019

(65) Prior Publication Data

US 2021/0166473 A1    Jun. 3, 2021

(51) Int. Cl.

| G06T 17/05 | (2011.01) |
| H04W 4/029 | (2018.01) |
| G06F 16/29 | (2019.01) |
| G06F 16/487 | (2019.01) |
| G06T 15/10 | (2011.01) |
| H04W 4/021 | (2018.01) |
| H04L 29/08 | (2006.01) |
| G06T 19/00 | (2011.01) |
| H04W 4/02 | (2018.01) |

(52) U.S. Cl.
CPC .............. *G06T 17/05* (2013.01); *G06F 16/29* (2019.01); *G06F 16/487* (2019.01); *G06T 15/10* (2013.01); *G06T 19/006* (2013.01); *H04L 67/18* (2013.01); *H04W 4/021* (2013.01); *H04W 4/023* (2013.01); *H04W 4/029* (2018.02)

(58) Field of Classification Search
None
See application file for complete search history.

(56) References Cited

U.S. PATENT DOCUMENTS

| 8,803,916 | B1 | 8/2014 | Paczkowski et al. | |
| 9,529,857 | B1* | 12/2016 | Myllymaki | G06F 16/29 |
| 2002/0095276 | A1 | 7/2002 | Rong et al. | |
| 2002/0163521 | A1 | 11/2002 | Ellenby et al. | |
| 2010/0045700 | A1 | 2/2010 | Lefevre et al. | |
| 2011/0238751 | A1 | 9/2011 | Belimpasakis et al. | |
| 2013/0050260 | A1* | 2/2013 | Reitan | G09G 5/377 345/633 |
| 2015/0109338 | A1* | 4/2015 | McKinnon | G06F 16/50 345/633 |
| 2016/0133230 | A1 | 5/2016 | Daniels et al. | |

(Continued)

*Primary Examiner* — YuJang Tswei
(74) *Attorney, Agent, or Firm* — Guntin & Gust, PLC; Ralph Trementozzi

(57) ABSTRACT

Aspects of the subject disclosure may include, for example, identifying a physical domain, identifying a geometry of a digital entity adapted for presenting digital content within a rendered display of the physical domain according to the geometry and storing the geometry in association with the physical domain to obtain a stored geometry. A location of equipment of a user is determined and associated with the physical domain to obtain an association. Responsive to the association, the stored geometry is provided to the equipment of the user for presenting the digital content within the rendered display of the physical domain according to the geometry. Other embodiments are disclosed.

20 Claims, 10 Drawing Sheets

(56) References Cited

U.S. PATENT DOCUMENTS

| | | |
|---|---|---|
| 2017/0053442 A1 | 2/2017 | Sumner et al. |
| 2017/0237789 A1* | 8/2017 | Harner .................... G06F 3/017 709/205 |
| 2018/0250589 A1 | 9/2018 | Cossairt et al. |
| 2018/0308024 A1 | 10/2018 | Kilner et al. |
| 2019/0087842 A1 | 3/2019 | Koenig |
| 2019/0213795 A1 | 7/2019 | Dange |

* cited by examiner

Sports ID Template Arrays
210 sportsTemplateArray(1928, 9125, 8726)

Canonical ID Template Arrays
215

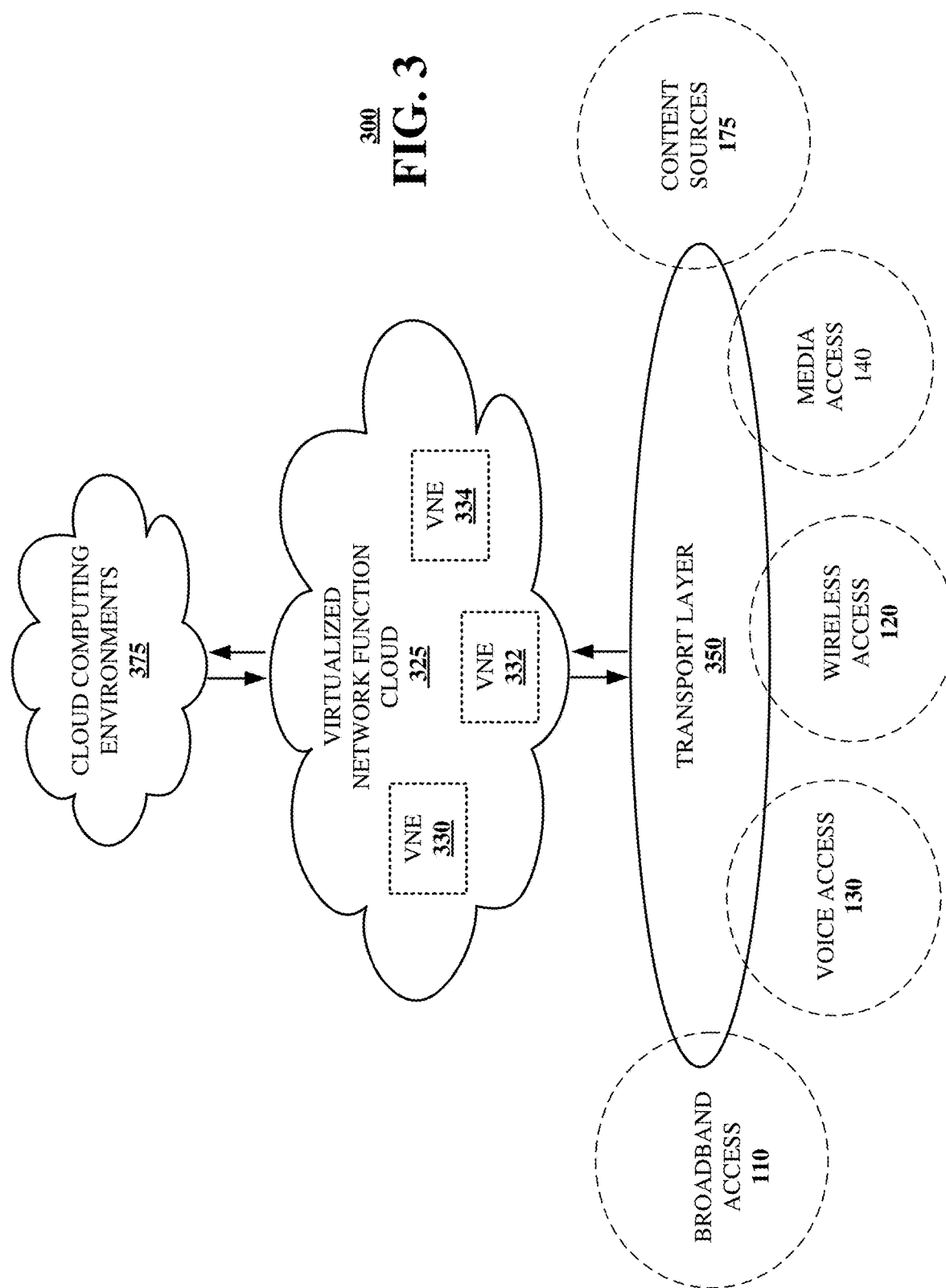

SYSTEM AND METHOD FOR PRESERVING A CONFIGURABLE AUGMENTED REALITY EXPERIENCE

FIELD OF THE DISCLOSURE

The subject disclosure relates to a system and method for preserving a configurable augmented reality experience.

BACKGROUND

Augmented reality (AR) systems generally supplement a real-world environment with simulated elements. For example, AR systems may provide digital enhancements to real-world environments in which objects that reside in the real-world can be enhanced by computer-generated perceptual information. Some application allow a user to aim a sensor (e.g., a camera) of a mobile device at a physical environment and view augmented reality content in conjunction with the physical environment within a display screen of the mobile device. Such computer-generated imagery can be presented on the display to enhance the real-world environment, and can include elements that are contextually-related to the real-world environment. Such elements can include simulated text, images, objects, etc.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
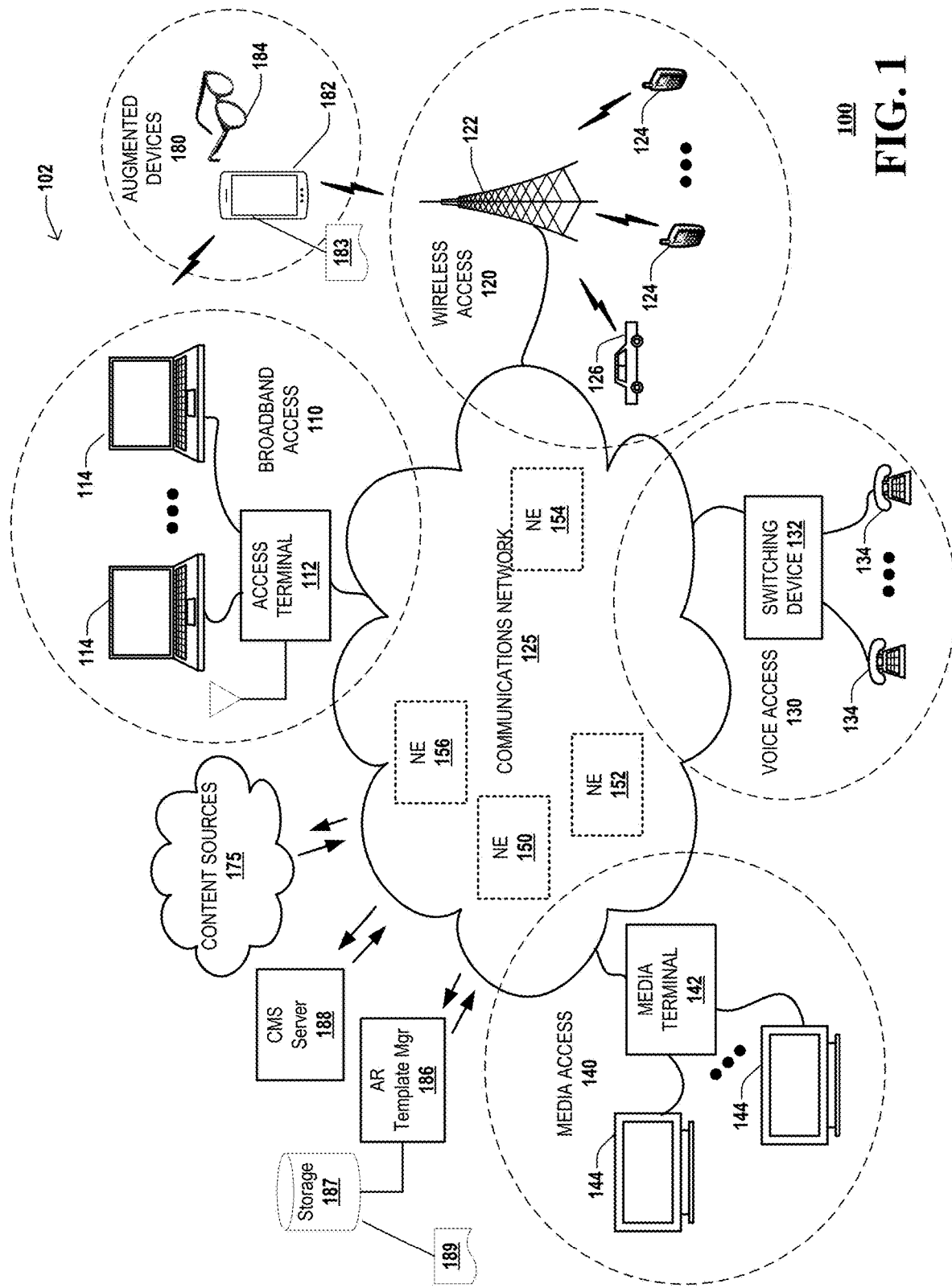
FIG. 1 is a block diagram illustrating an exemplary, non-limiting embodiment of an AR application management system in accordance with various aspects described herein.

The subject disclosure describes, among other things, illustrative embodiments for applying template schemes that allow users to create groupings of digital content, including streamable assets, and save or otherwise retain them in associations with different physical domains or zones, and/or at times they prefer. For example, a user may prefer to consume news content while at the office, sports information while at home in their living room, cooking channels in the kitchen, and so on. Other embodiments are described in the subject disclosure.

One or more aspects of the subject disclosure include a device, having a processing system including a processor and a memory that stores executable instructions that, when executed by the processing system, facilitate performance of operations. The operations include determining a physical domain, obtaining a geometry of a digital entity adapted for presenting digital content within a rendered display of the physical domain according to the geometry, and storing the geometry of the digital entity in association with the physical domain to obtain a stored geometry. A location of equipment of a user is detected and the location of the equipment of the user is associated with the physical domain to obtain an association. Responsive to the association, the geometry is provided to the equipment of the user, wherein the equipment of the user presents the digital content within the rendered display of the physical domain according to the geometry.

One or more aspects of the subject disclosure include a process that includes determining, by a processing system including a processor, a physical domain, obtaining, by the processing system, a geometry of a digital entity adapted for presenting digital content within a rendered display of the physical domain according to the geometry, and storing, by the processing system, the geometry of the digital entity in association with the physical domain to obtain a stored geometry. A location of equipment of a user is determined, by the processing system, and associated, by the processing system, with the physical domain to obtain an association. Responsive to the association, the geometry is provided, by the processing system, to the equipment of the user, wherein the equipment of the user presents the digital content within the rendered display of the physical domain according to the geometry.

One or more aspects of the subject disclosure include a non-transitory, machine-readable medium, including executable instructions that, when executed by a processing system including a processor, facilitate performance of operations. The operations include identifying a physical domain, identifying a geometry of a digital entity adapted for presenting digital content within a rendered display of the physical domain according to the geometry, and storing the geometry of the digital entity in association with the physical domain to obtain a stored geometry. A location of equipment of a user is determined and associating with the physical domain to obtain an association. Responsive to the association, the geometry is provided to the equipment of the user, wherein the equipment of the user presents the digital content within the rendered display of the physical domain according to the geometry.

Media content providers and creators are always seeking ways to better engage and attract viewers of media content. For example, various mobile applications have been developed that allow a user to watch a media content instance (e.g., a television program or a broadcast of a live event) on a television or other suitable display device, and, at the same time, access additional content associated with the media content instance by way of a mobile device (e.g., a mobile phone or tablet computer). Augmented spatial reality hardware offers a new paradigm for content consumption. Unfortunately, as augmented devices become more proliferated, so do the abundance of content population overhead.

The techniques disclosed herein include a use of data structures, sometimes referred to as templates, AR templates, or cloud templates, to facilitate manageability of a user's environment and favorite content items. Templates allow a user to create multiple different groupings of digital assets, including streaming digital assets that can be cached to a users' profile. In at least some embodiments, the user's profile is maintained in a readily accessible manner, e.g., via network connectivity, that can be referred to as being "in the cloud." The AR templates can be recalled by equipment of a user to augment the user's physical domain to enjoin a curated grouping of digital content, e.g., titles and/or sources, easier than individually searching and discovering. Accordingly, the templates can record a user's journey of grouping and spatially placing augmented experiences around their environment. The experiences can then be managed remotely, e.g., through updatable array structures, or cloud arrays, and consumed immediately at will.

In some instances the AR templates can serve as a starting point, whereby subsequent alterations, additions, deletions, substitutions, reconfigurations, and the like, are captured in new and/or updated AR templates. Beneficially, the network-accessible templates scale to a user's physical domain, such as the user's home, office, vehicle, and more as they create containers of their favorite experiences, that can be persistently saved. In at least some embodiments, the templates or at least some elements of the templates can mesh, allowing a user to access and/or share digital content items across different physical locations, different times of day, during different activities, and so on.

Referring now to FIG. 1, a block diagram is shown illustrating an example, non-limiting embodiment of an AR application management system 100 in accordance with various aspects described herein. For example, the AR application management system 100 facilitates in whole or in part creation, management and/or implementation of AR templates that provide a capability to persist digital consumption experiences that users finds unique to themselves and their physical environments or surroundings, allowing users to come back to or otherwise return to those experiences time and time again. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

According to the illustrative embodiment, the AR application management system 100 includes one or more augmented devices 180, and AR template management system 186, and a content management system (CMS) server 188. The augmented devices 180 can include, without limitation, head-mounted displays 184, e.g., glasses, goggles, retinal projection, and/or other devices, including handheld mobile devices 182 adapted to present AR experiences, such as tablets, smartphones, laptops.

The augmented devices 180 can include one or more AR applications 183 that integrate digital content into a user's perception of their current physical domain, environment or surroundings. Without limitation, the integration can include information identifying one or more of an identification of a particular user, an identification of a physical domain within which the user resides, a description of one or more viewing areas or locations within the physical domain assigned for a presentation of digital content, and an association of one or more digital content items with the viewing areas. Such identifying information can be captured in a data structure, such as database records, that can be referred to as AR templates or cloud templates.

The AR application 183 of an augmented device 180 can obtain a user identifier, such as a user ID, a username and/or password, and the like as may be obtained from an authentication process. Alternatively or in addition, an identifier can include an equipment identifier, such as a subscriber identity module (SIM), and/or any other suitable user and/or equipment unique identifier, such as a media access control (MAC) address. The user and/or device identifier can be provided to the AR template manager 186 via the communication network 125. According to the illustrative example, the augmented devices 180 are mobile devices in communication with the communications network 125 via one or more of the broadband access equipment, e.g., a wireless broadband access terminal 112 and the base station or access point 122 of the wireless access infrastructure 120. It is conceivable that in at least some embodiments, the augmented devices 180 can communicate with the AR template manager 186 via one or more of the other access infrastructures, including the media access infrastructure 140 and the voice access infrastructure 130.

The augmented device 180 may provide an indication of a physical location within which the augmented device 180 is operating. For example, the location indication can include a geolocation of the device 180, e.g., as obtained via a GPS receiver of the device 180 and/or a GPS receiver tethered to the device 180. Alternatively or in addition, the location indication can include one or more of an access point identity of a network access point employed by the device 180, a device location estimation obtained by the wireless access infrastructure 110, 120, and so on. In at least some embodiments, the physical location is determined according to an image of the physical surroundings obtained by a sensor of the device 180 or another image capture device to which the augmented device 180 is locally tethered. In at least some instances, an identification of the physical location can be obtained by a user input, e.g., an SMS text to the AR template manager 186, a selection within the AR application 183 from a menu of location options, a voice entered description, and the like. Other techniques for determining the physical location of the device 180 include a user's calendar and/or schedule, determination of a location of other devices associated with the user, such as the user's laptop and/or vehicle. It is understood that any of the foregoing location techniques can be used alone or in any combination.

The AR template manager 186 having received user and/or equipment identification and determined at least an approximation of a user location, can identify an AR template 189. For example, the AR template 189 may have been preconfigured by the user and/or the AR application 183 and stored in a retrievable manner according to a storage device 187 in communication with the AR template manager 186. The AR template 189, and/or information from the template 189, can be provided to the AR application 183 of the augmented device 180. The provided information can include a geometry of one or more digital entities within the identified physical domain. The geometry can include, without limitation, one or more of a number of digital entities, their respective sizes, locations, arrangements, priorities, and the like.

The AR template manager 186 can obtain additional information from the AR template 189, including digital content items and/or digital content sources 175 associated with the identified digital content items. The template manager 186 may provide the digital content and/or source identifying information to the AR application 183 of the augmented device 180, allowing the AR application 183 to access the associate digital content and/or content sources 175 via the network 125, e.g., according to a CMS server 188. The AR application 183 can proceed to render and/or facilitate a rendering of an AR presentation of the physical domain that includes the associated digital content provided according to the geometry obtained from the template 189.

Alternatively or in addition, the AR template manager 186 may access the associated digital content and/or content sources 175 via the network 125, e.g., according to the CMS server 188, providing the digital content to the AR application 183. The AR application 183, in turn, integrates the digital content, according to the geometry, into an AR scene portrayed to the user via the augmented device 180. It is understood that in at least some applications, the AR template manager 186 is adapted to access the associated digital content and/or content sources 175 via the network 125, and to integrate the digital content, according to the geometry, into an AR scene portrayed to the user via the augmented device 180, or provide the associated digital content in a suitable form, e.g., an overlay, for integration with a scene of the physical domain. A determination as to where one or more of the processing steps, such as the adapting of the digital content to the geometry and/or integration of the adapted digital content with a scene of the physical domain may depend upon one or more of a capability of the augmented device, network conditions, subscription levels, and the like.

Figure 2A:
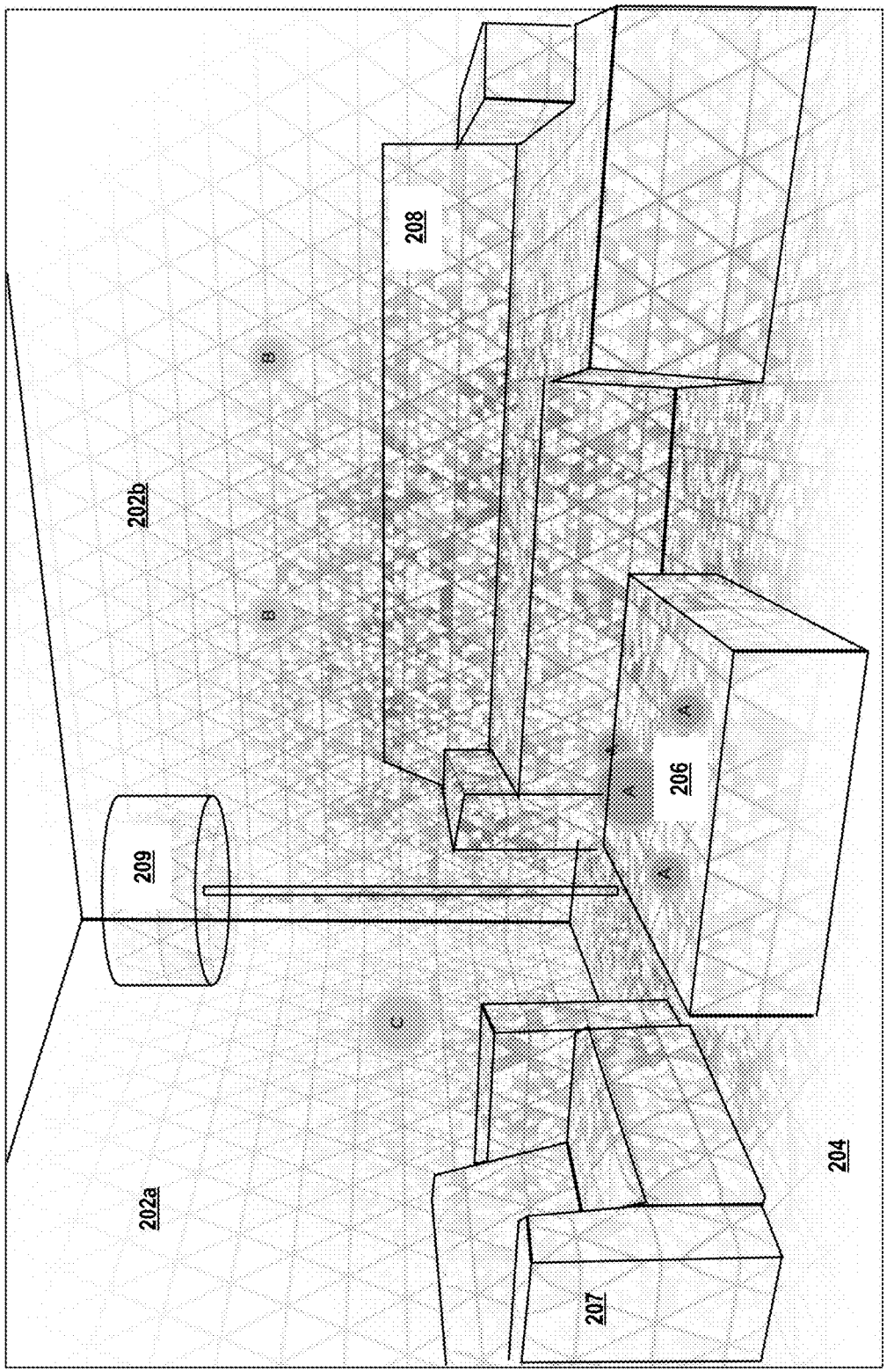
FIG. 2A is an example machine interpretation of a physical environment according to an AR application of a system functioning within the communication network of FIG. 1 in accordance with various aspects described herein.

FIG. 2A is an example machine interpretation of a physical environment 200 according to an AR application management system 100 of FIG. 1. The physical environment 200 includes one or more walls 202a, 202b, a floor 204, and furniture items, such as a chair 207, a sofa 208, an ottoman or table 206 a lamp 209, and the like. In at least some embodiments, the physical environment is determined according to a direction of view of a user of the augmented devices 180 (FIG. 1). Thus, in addition to identifying the physical domain or environment, contents of a particular scene can be identified or otherwise determined according to a field of view (FoV) of the augmented devices 180.

The machine interpretation of the FoV can be obtained by any suitable technique, such as image processing to identify image features, such as lighting, colors, edges, textures, and the like. Alternatively or in addition, the machine interpretation of the FoV can include object recognition, e.g., based on one or more identified image features in association with pattern recognition. A process of object recognition can be simplified in at least some instances, according to an association of a location of the augmented viewing device with a physical domain. For example, if it is determined that a user is within a home, that may limit the types of objects to walls, doors, windows, furniture, and the like. If it is determined that a user is within a particular part or room of the home, that can further limit the types of objects. For example, a dining room table would not be expected within a bedroom, nor would a bed be expected within a kitchen.

The example machine interpretation of a physical environment 200 includes one or more letter references, e.g., "A," "B," and "C." In at least some embodiments, the letter references are associated with geometries, or locations of digital entities to be portrayed within a rendering of a scene of the physical environment. Example locations "B" include a wall 202b, above a sofa 208. Other locations "A" include a tabletop surface of a coffee table 206. Still other locations include a space "C" position in relation to a chair 207. The space "C" may not be assigned to a particular surface, but arranged to appear as though floating in front of a user seated in the chair 207.

The letter references can refer to particular digital entities, e.g., digital content and/or content sources, such as a particular news channel, a particular source of stock quotes, a particular channel or source of sports information, entertainment selections, shows, episodes, channels and so on. Alternatively or in addition the letter references can be associated with categories of content, without necessarily identifying a particular content item, a particular content source, and the like. Consider reference "A" as associated with personal assistant based services. A location for presentation of personal assistant based content may be preferred in a central location, e.g., a centerfold—placed in an area that could be easily accessed by user, naturally low in stature, without causing strain to user. The example personal assistant based content A is placed on or near the surface of the table 206 to provide a centralized, easily observable area, i.e., not on ceiling. In at least some embodiments, the personal assistant based content A is persistent and always recurring.

Likewise, a location for presentation of entertainment based content B may be preferred in a location along a wall that is easily viewable from a seated position, e.g., along a wall 202b opposite a sofa 208 or chair 207. The entertainment based B can be presented as a virtual television type display or screen within the physical environment. A location for work-related content C can be placed near work area, such as near a chair 207, or desk that the user associates primarily with work tasks. Cork-related content can be positioned so as not to interfere with and/or distraction from other activities, including other digital entity locations, such as the personal assistant locations A and/or the entertainment locations B. Examples of work-related content C can include presenting a calendar, reminders, a message board, stock trackers, news, e.g., Reddit®, online social networking services and the like. Social media content, such as Facebook®, Twitter®, Instagram® social media applications and the like can be associated with work-related locations C and/or entertainment-related locations B. In some embodiments, it is envisioned that social media applications can be characterized as an independent class of content to facilitate arrangement of digital content within the user's physical space. The various categories or classes of content can be identified according to dictionaries, e.g., determined beforehand by a user and/or by an AR application service provider to facilitate a user's organization of their AR configuration.

In some applications a user and/or AR service provider may include and/or otherwise require a category and/or location for advertising content. Advertising content may be include, e.g., in a form of a commercial interruption to one or more digital entities in a user's physical domain. In some instances, the advertisements may be included within the digital content item, e.g., image and/or media stream itself. Alternatively or in addition, the advertisements may be included according to a particular location, e.g., a billboard or advertising placard or banner positioned within an AR rendering of the user's physical location. It is envisioned that such dedicated advertising locations may be associated with an advertising digital content source. The advertising digital content source may provide targeted advertisements to particular individual, e.g., as determined by a user and/or device identifier.

Alternatively or in addition, the advertisements may be selected or otherwise targeted according to a location within the physical environment to which the user has associated the content item. For example, advertisements of kitchen products, or food may be selected and/or otherwise presented as advertisements within geometries located within a user's kitchen or pantry, advertisements for automobiles, or transportation may be presented as advertisements within geometries located within a user's garage, on a bus or train frequented by the user, and so on.

In at least some embodiments, the digital content can be identified according to a content array. The content array may identify a preferred arrangement of a single digital entity within a user's FoV, and/or with an arrangement of multiple digital entities within the user's FoV. Providing such flexibility to a user, allows the user to adjust their FoV to a productive, palatable, or otherwise preferred arrangement, including locations or geometries and content. Once an AR template has been established, it allows a user to view an AR presentation of a physical space, e.g., a room, at a glance, wherein the room has a persistent arrangement of content that can be consumed when the locations are within the user's FoV.

Figure 2B:
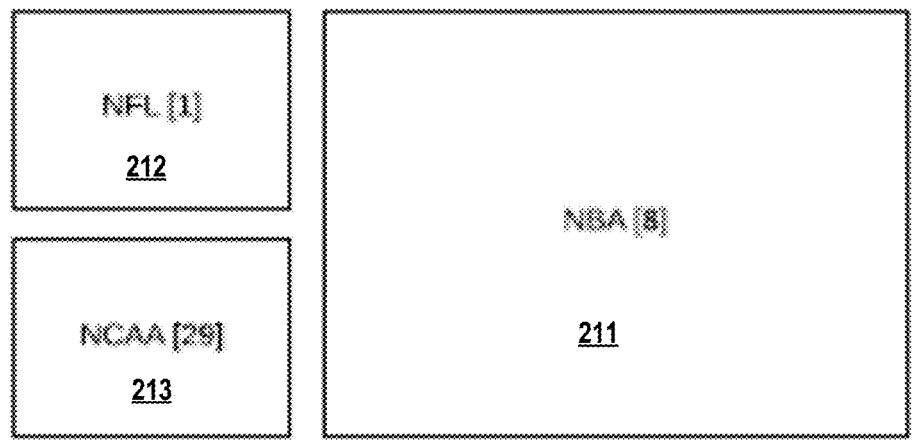
FIGS. 2B and 2C are schematic diagrams illustrating an example, non-limiting embodiment of template arrays according to an AR application of a system functioning within the communication network of FIG. 1 in accordance with various aspects described herein.
Figure 2C:
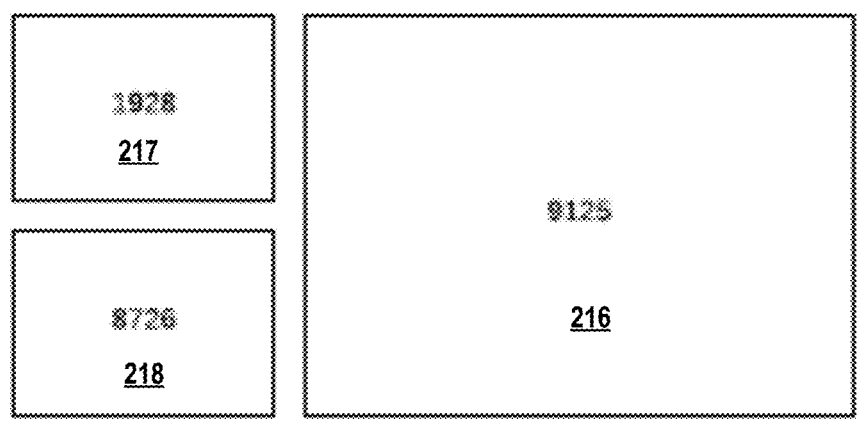

FIGS. 2B and 2C are schematic diagrams illustrating example, non-limiting embodiments of template arrays 210, 215 according to an AR application of a system functioning within the communication network of FIG. 1 in accordance with various aspects described herein. The template arrays 210, 215 can be used to identify what spaces in the physical world are represented by digital entities. The digital entity spaces can be defined at least in part according to their locations within the physical environment. Such position information can be determined according to one or more of a fixed or relative position, e.g., determined according to a GPS receiver, and/or according to a fixed or relative coordinate system, such as three dimensional (3D) plane system, e.g., a Cartesian coordination system (x,y,z) applied to an augmented representation of the physical environment.

Beneficially, the template arrays allow a user and/or digital content provider to compete with a number of different digital experiences that can be defined in a single pixel space in a physical environment. For example, a digital entity can include a digital representation of a TV or display screen that's not really present within the physical environment. However, when a user views the physical environment according to augmented devices 180 (FIG. 1), the digital entities, e.g., the TV screens, appear as though present within the physical environment.

Accordingly, the template arrays 210 can identify one or more of a shape, a size, a position, associated content, e.g., images, text, data, streaming media including video and/or audio. It is further understood that with respect to audio content, a position can be represented according to directed sound, e.g., stereo, surround sound, and the like, that presents a sound as though originating at a location associated with the template arrays 215 215. According to the illustrative embodiments, the template arrays 210, 215 can be associated with a located within the user's environment, e.g., upon a wall 202b (FIG. 2A) within the user's home. Thus, the digitally defined television is rendered in a user's FoV as though it is physically attached to the wall 202b, where a TV may be hanging, where a mirror or painting is located, or at a relatively blank or unused or otherwise unobstructed location along the wall 202b. Other locations for attaching or positioning the digital display can include, without limitation, upon a door above a closet, attached to window, on a lampshade, a tabletop, a desk, floating in proximity to the user and/or to an object within the user's environment and so on. Each digital TV can be defined by one or more vertices in a 3D digital plane system (x,y,z) of the user's environment. For environmental surfaces that may not be flat or planar, such as an upholstered furniture item, or a lampshade, a representation of the digital entity, e.g., TV, can be presented as though the surface were flat and/or smooth. Alternatively or in addition, the digital entity can be presented as though the TV screen contours to the surface. Consider a lampshade that provides news in a news ticker format.

The template arrays 210, 215 allow the user, AR service provider and/or advertiser, or any other controlling entity to identify arrangements of digital content items including streaming media within the AR representation of the user's physical reality. The particular geometry or arrangement, the particular content items or any combination thereof provides a user with a particular experience determined according to the AR presentation of the digitally altered physical reality. Moreover, the template arrays 210, 215 can be stored indefinitely and used to regenerate or otherwise recreate an associated altered reality at a later time. The template arrays 210, 215 can be saved locally and/or remotely, e.g., in a network accessible template repository, or in "the cloud."

Thus AR templates or cloud templates allow a user to populate a scene of a physical domain according to an augmented representation of user's physical environment, e.g., according to metadata associated with the scene (e.g., TVs). By way of illustrative example, a first template array 210 provides a sports-related template 201. The template includes three rectangular screens 211, 212, 213. A first screen 211 is larger than the other two and is referred to herein as a main screen, which has been associated with NBA content. The two smaller screens 212, 213 have been associated with NFL content and NCAA content, respectively. The template allows the user to persistently save the particular content options, i.e., NBA, NFL and NCAA in association with the predetermined sizes, shapes and configurations as presented within an AR presentation of a scene of the user's environment. The template can be further associated with the user and in at least some embodiments, with a physical location within which the user has chosen to consume the selected content.

The template array 215 of FIG. 2C can be referred to as a canonical ID template array. As in the sports template array, 210, the canonical template array 215 includes three rectangular regions, 216, 217, 218. A first rectangular region 216 is larger than each of the other two regions 217, 218 considered alone or in combination. A user might select the canonical template array 210 from a selectable menu, e.g., via a user interface and/or user portal. The user can associate the canonical template array 215 with the user's identity. Alternatively or in addition, the user can associate the canonical template array 215 with a physical domain, e.g., location where the user desires to consume digital content, e.g., streaming media, according to the canonical template array 215. In at least some embodiments, the user can associate each of the three rectangular regions 216, 217, 218 with a particular digital content item, e.g., a media file, a program guide, a prerecorded content item, e.g., accessible via a DVR menu, and so on.

According to the template array 210, the user can open or otherwise revisit that particular "experience" on demand, obtaining a predetermined, preferred presentation configuration of the user-selected content. It is further envisioned that a user may reconfigure their AR environment, e.g., moving NBA content to one of the smaller virtual screens 212, 213 and moving content from one of the smaller screens, e.g., NFL content to the larger screen area 211. Alternatively, the user may select different content altogether, for any conceivable reason. As the user manipulates content, content sources, content presentation configurations, and the like, a database and/or cache of a persistent array of content options is updated and maintains.

It is understood that in at least some instances, the template arrays can be stored or otherwise retained or configured in a hierarchal configuration. For example, a location array (xyz) can be configured according to a hierarchy determined according to one or more of where the digital entity is located within a user's physical environment, a priority of content, e.g., work content taking priority over personal or leisure content, and so on. In at least some embodiments, the hierarchy can be repeat across a number of different environments. In at least some applications a hierarchy can include other dimensions of ordering, such as time of day, an activity in which the user is participating, availability of preferred content, time sensitive content, real-time content, and so on. Consider work-related items being elevated or otherwise ordered according to a preference during working hours. Thus, the largest rectangular area 216 of the canonical template array 216 can be delegated to work-related digital content, such as document review, video conferencing, calendars, training, and so on; whereas, one or more of the smaller rectangular areas 217, 218 might be associated with a personal email account, social media, e-commerce, and the like. It is understood that the ordering of digital content and/or its presentation in an AR environment can be reconfigured automatically during non-business hours, e.g., swapping the work content of the larger rectangular region 216 with leisure content, such as news, or entertainment.

Alternatively or in addition, the hierarchy and/or ordering of digital content can vary according to the user's location. While a user is physically at work, the work related content takes priority in any AR presentations. Alternatively, when the user is physically present at a non-work location, such as at home, in a train or bus, at a club or restaurant, non-work related content takes content in the AR presentation. It is understood that some content can be excluded altogether according to the template arrays based on one or more of user identity, location, time of day, preferences, and the like. For example, the template array can include a negative association that prevents or otherwise blocks certain content according to one or more of the template arrays, the hierarchal ordering and so on.

In short, the template arrays allow a user to set up or otherwise establish a preferred digital consumption environment in a particular physical environment that the user wishes to repeat at another time and/or location. The user saves one or more templates that allow the user to repeat a preferred AR scenario by recalling any combination of the one or more templates. It is envisioned that in at least some embodiments, the templates can be arranged in layers, such that a rendering of a physical scene by augmented devices can selectively apply one or more separate layers, each layer being determined according to a respective template. It is envisioned that such layering can be determined according to a predetermined rule or logical order. Some example rules allow for digital content of one layer to overwrite digital content of another layer. Other rules may exclude such overwriting, e.g., preserving one layer as a top layer that cannot be overwritten. Other rules may alter a template to effectively redefine a digital entity location and/or prevent its presentation in an AR rendering of a physical environment so as to avoid conflicts with one or more objects within the physical environments, e.g., persons, faces, real TVs, windows, and/or one or more other digital entities, e.g., according to a predetermined and/or imposed hierarchy.

(2) User travels to a foreign/remote physical environment (e.g., hotel), and wishes to recreate or otherwise approximate their preferred home experience in the foreign location. User recall's cloud template with preferences. Application interprets foreign physical environment and re-map user's digital consumption selections (e.g., to an approximation of user's home environment). Searches for familiar items, such as desk, bed, chair, wall, window, sofa, etc. (may choose to avoid certain locations, such as lights, windows, persons, etc.

The various techniques disclose herein allow a user to establish or otherwise access multiple different types of templates. In at least some embodiments, the templates allow the user to context switch between consumed digital content within a common physical space. Namely, the same physical space can be used to consume sports (e.g., according to game schedule/broadcast) and to engage in digital learning, e.g., musical instrument (e.g., according to time of day, day of week, mood). It is understood that in at least some embodiments systems implementing the techniques disclosed herein may provide suggestions to a user to initiate consumption of digital content based on one or more of a time of day, a location, a schedule, a perceived and/or self-declared mood, content preference, recommendations, e.g., news bulletin, auctions, and so on.

Figure 2D:
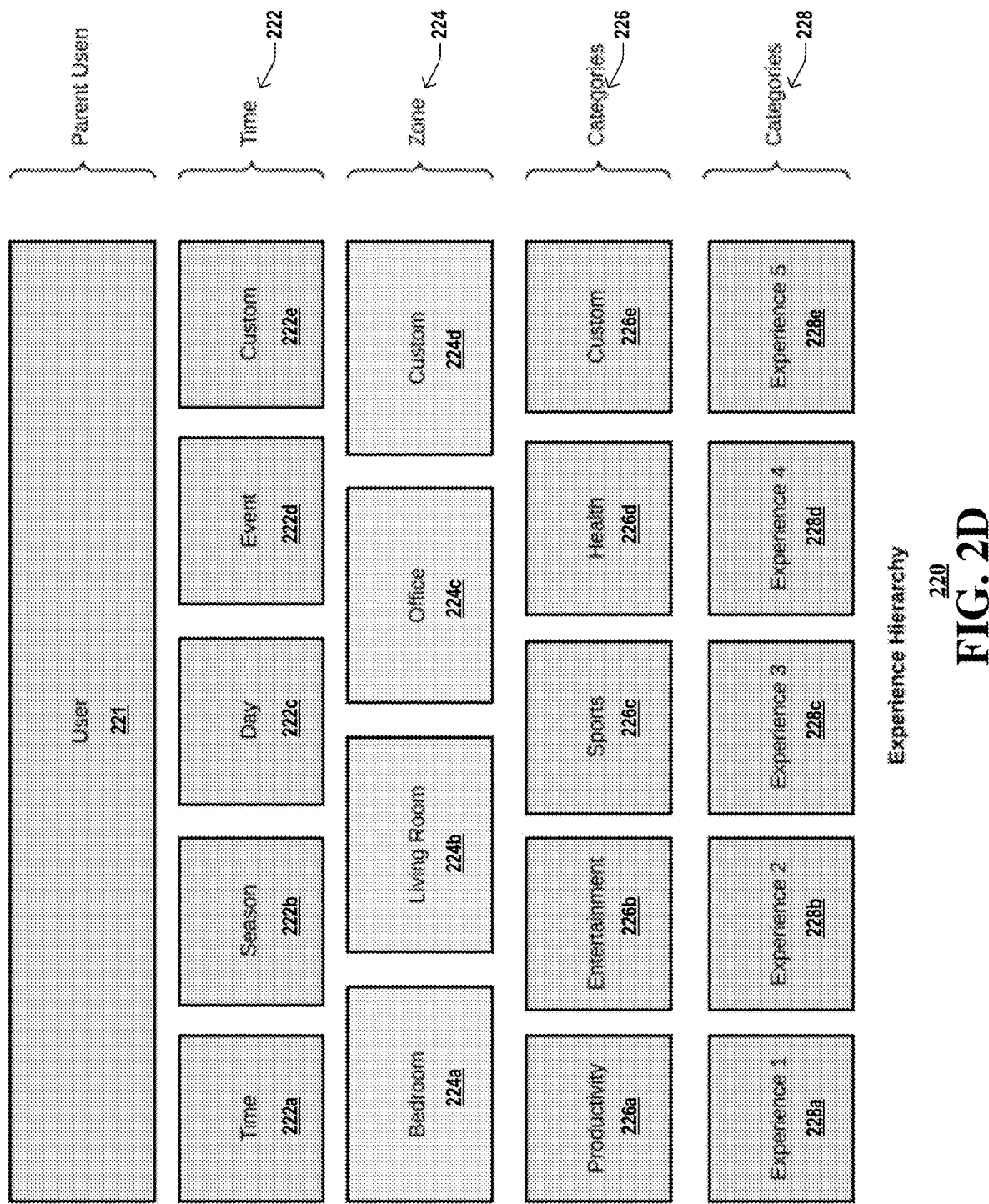
FIG. 2D is a schematic diagram illustrating an example, non-limiting embodiment of an AR experience hierarchy according to an AR application of a system functioning within the communication network of FIG. 1 in accordance with various aspects described herein.

FIG. 2D is a schematic diagram illustrating an example, non-limiting embodiment of an AR experience hierarchy 220 according to an AR application of a system functioning within the communication network of FIG. 1 in accordance with various aspects described herein. A template array 210, 215 (FIGS. 2B-2C) can be processed according to an experience hierarchy 220 to adjust and/or otherwise control an AR presentation of the template array 210, 215, including one or more of which digital objects are presented, their relative sizes, locations, and/or shapes, content presented in association with the digital objects and so on. The example AR experience hierarchy 220 can include a user identifier 221. The user identifier can be a particular user and/or a class of users, e.g., students of a class that presents instructional material in an AR context. Other components of the AR experience hierarchy 220 can include one or more of time or temporal elements 222, physical location or zonal elements 224, content categories 226, experiential categories 228, and so on.

Without limitation, temporal elements 222 can include one or more of time of day 222*a*, season 222*b*, day of week and/or month 222*c*, event 222*d*, e.g., according to a calendar, and/or one or more other custom temporal elements 222*e*. Similarly, zonal elements 224 can include one or more of a particular environment, such as a bedroom 224*a*, a living room 224*b*, an office 224*c*, or any other combination of custom zones 224*d*. It is understood that the zonal elements can be associated with a particular room, e.g., the user's bedroom 224*a*, the user's living room 224*b*. Alternatively or in addition, the zonal elements 224 can be associated with classes of zones, such as any bedroom 224*a*, any living room 224*b*, any office 224*c*, and so on.

For example, an employee may not want to perform work related activity while at home, i.e., they don't want to get drawn back in. For such applications an AR template may persist work-related digital entities and/or related content only during work hours, and/or while a user is located at their workplace. Other entities, can persist regardless of time of day and/or location. These digital entities may be provide constant reminders of experiences the user should be participating in based on time of day and/or location. Still other digital entities, e.g., news in morning, live local in evening can be channeled into video on demand content, e.g., with an aim of bringing a user back into the environment.

It is understood that certain classes of environments may share one or more physical attributes that can be represented in a reliable manner according to the template. Such classes of zones 224 can facilitate a user transferring their preferred experiences to other physical locations, without necessarily having to regenerate them in any significant manner. Consider a user who is traveling and staying in a hotel room. It is understood that certain features of a hotel room or suite can be associated with zonal classes 224 to allow the user to recall and apply a template from a corresponding zonal class.

Other components of the experience hierarchy 220 can be associated with particular applications, e.g., productivity 226*a*, entertainment 226*b*, health 226*d*, and so on. Consider a user that establishes a workout experience according to a health category 226*d*, "workout" that includes certain digital entities presenting certain digital content. Examples might include presentation of a user's workout schedule, a clock or timer, instructional video clips shown a proper way to perform a particular exercise, a user's favorite TV shows and/or music to be consumed during a workout and so on. Such a health related experience may be recalled with the identified user is physical located in a gym facility or at a home gym, and during a time of day and/or day of week in which the user has scheduled workout activity.

In at least some applications the AR application 183 (FIG. 1) and/or AR template manager 186 can access a stored experience hierarchy 220 for a user and apply one or more features of the experience hierarchy 220 to template arrays to control access and/or presentation of digital content, e.g., streaming media, within an AR presentation of a user's physical location. It is understood that one or more rules, policies and/or logic can be applied to one or more of the components of the experience hierarchy 220. Logic might include user preferences, service provider imposed policies, subscription levels, communication link conditions, e.g., deferring to lower quality content when link conditions are compromised, and so on. The applied logic can automatically present a user with an AR experience based on one or more conditions, e.g., determined according to the hierarchy. Alternatively or in addition, the applied logic can present a user with an option to consume an experience determined according to the hierarchy. The user may choose to proceed with the experience, to substitute another experience, to defer the experience, and/or to alter the experience. In at least some embodiments, a user is presented with an option to update an existing template according to user modifications. Alternatively or in addition, the user may opt to store a modified experience as an entirely new experience. Such options can be presented via an AR application user interface, via an SMS message sent to equipment of the user, via email, and the like.

Figure 2E:
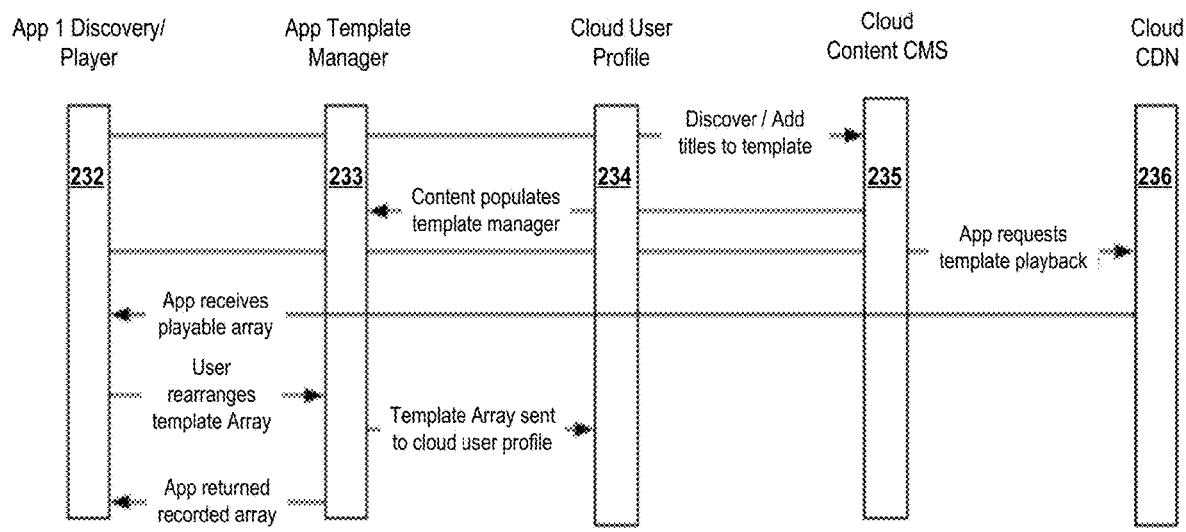
FIGS. 2E and 2F are block diagrams illustrating example, non-limiting embodiments of AR applications of a system functioning within the communication network of FIG. 1 in accordance with various aspects described herein.
Figure 2F:
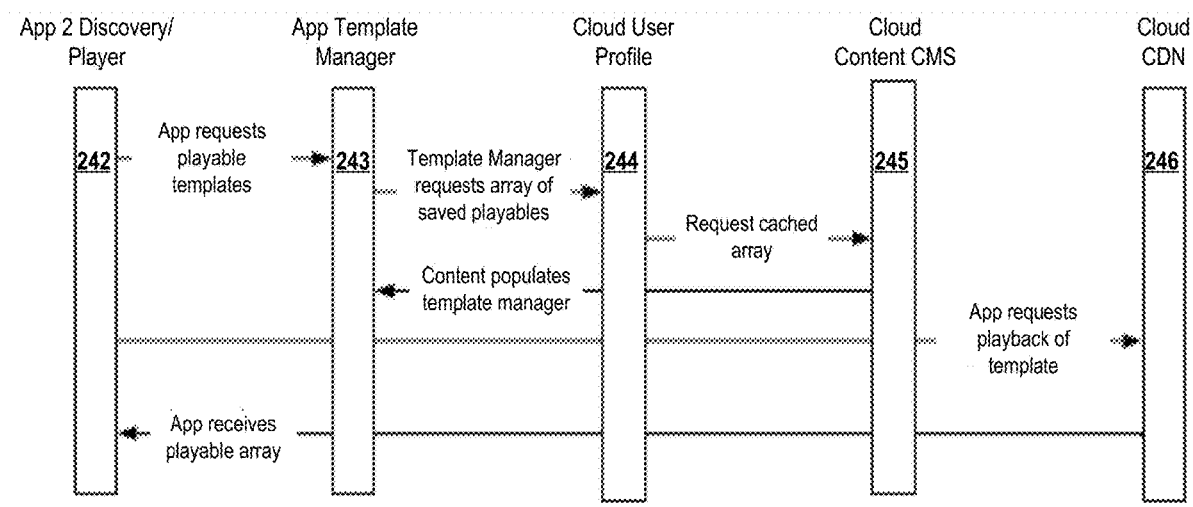

FIGS. 2E and 2F are block diagrams illustrating example, non-limiting embodiments of AR application flows 230, 240 of a system functioning within the AR application management system of FIG. 1 in accordance with various aspects described herein. According to a first AR application flow 230, the AR application 232 discovers and/or otherwise identifies a first user or player. User identification can be accomplished according to any suitable techniques including, user identification, user authentication, equipment IDs, user biometrics, e.g., finger print, facial recognition, voice recognition, and the like. The AR application 232 passes the first user's identity to an application template manager 233, which accesses a first user profile 234, e.g., stored in the cloud. The first user profile 234 can be used to identify one or more content items, e.g., content titles and/or sources, passing the identified titles to a CMS system 235 adapted to serve the identified content. It is understood that such service of content via the CMS system 235 may be subject to certain restrictions, including without limitation, the first user's identity, level of subscription, parental controls, availability, and so on.

Having identified the first user, a template array, and the content, e.g., according to an experience hierarch accessed via the network accessible first user profile 234, the AR application 232 coordinates playback of the template in coordination with a content delivery network 238. The content delivery network CDN 236 provides the content, which the AR application 232 configures into a playable array according to a particular predetermined first user experience.

In some embodiments, the first user rearranges their template array, e.g., by moving and/or reordering digital entities within the AR presentation. Alternatively or in addition, the first user may choose to rearrange their template array by selecting alternative content, e.g., substituting sitcoms for sports events, and the like. In response to template alterations, the AR application 232 rearranges the template array and provides the rearranged array to the application template manager 233. The application template manager may impose a quality check, permission, and/or other form of validation before sending the modified template array to the cloud user profile 234. The application template manager 233 returns the adjusted template array to the AR application 232 for processing and presentation within a rendered image of the first user's physical environment.

According to a second AR application flow 240, an AR application 242 requests one or more playable templates from an AR application template manager 243. The AR application template manager 243, in turn, requests an array of saved playable from a cloud user profile 244. The cloud user profile 244, in turn, requests a cached array from a cloud content CMS 245, which provides the cached array to the AR application template manager 243. Having successfully accessed the cached array, the AR application 242 requests playback of the template from a cloud CDN 246, which provides the playable array populated with content to the AR application 242. The AR application 242 facilitates presentation of the playable array in an AR rendering of the second user's physical location.

The templates may be templates predefined and/or pre-configured by the second user and/or by another user, such as the first user. It is envisioned that user experiences can be shared among different users to provide other users with a predetermined experience. Without limitation, user experiences can be shared by an owner or creator of the experience. Consider an instructor preparing a student experience and then selectively sharing the experience with student members to facilitate instruction. Other experiences can be shared among friends, loved ones, work colleagues, club members, affinity groups, and so on. In some embodiments, experiences can be shared by a service provider, such as an AR service provider, a content service provider, a network service provider and so on. The shared experiences might offer a catalog of experiences that may include certain default experiences. It is understood that any shared experience, including any default experiences can be tailored and/or otherwise modified by another user. These modified shared experiences can be stored as a user-specific experiences and in at least some instances shared, e.g., as improved experiences.

Experiences can include any conceivable experience in which access to digital content in an AR setting is beneficial. Certain examples of work experiences, educational experiences, and entertainment experiences have been disclosed. Other experiences include, without limitation, medical experiences in which a template array for a patient examining room and/or operating room can be pre-configured to display certain medical information in certain locations. Non-limiting examples include displaying a patient's medical records along a left wall of the examining/procedure room, other records, such as medical imaging can be displayed along a right wall of the examining room. A teleconference can be presented along an array of upper cabinets of the examining/procedure room and so on. In at least some embodiments, such a medical examination/procedural experience can be stored in association with the patient, a doctor, or a jointly according to patient and doctor. Such joint sharing can facilitate an AR presentation of each patient's information in a secure manner only when the patient is in the presence of the doctor and/or when the patient, the doctor, or both the patient and doctor are present within a particular location.

User identification can be accomplished according to any suitable techniques including, user identification, user authentication, equipment IDs, user biometrics, e.g., finger print, facial recognition, voice recognition, and the like. The AR application 232 passes the user identity to an application template manager 233, which accesses a user profile 234, e.g., stored in the cloud. The user profile 234 can be used to identify one or more content items, e.g., content titles and/or sources, passing the identified titles to a CMS system 235 adapted to serve the identified content. It is understood that such service of content via the CMS system 235 may be subject to certain restrictions, including without limitation, the user's identity, level of subscription, parental controls, availability, and so on.

In an illustrative example, the first user wishes to share an array of streamable assets that he or she tags and disperses across their home. The configured array, associated location, streamable content and order (e.g., timing) are uploaded to the cloud.

A second user of the group finds a great video that he or she wants to share with the first user and/or other members of the group. By configuring AR templates, each user can share enough data with each-other to exchange content, e.g., videos, between entities by sharing the array. Now the first user can control their favorite spatial template placing in the home while enabling dynamic updatable "streamable zones" for user to user sharing of content.

Figure 2G:
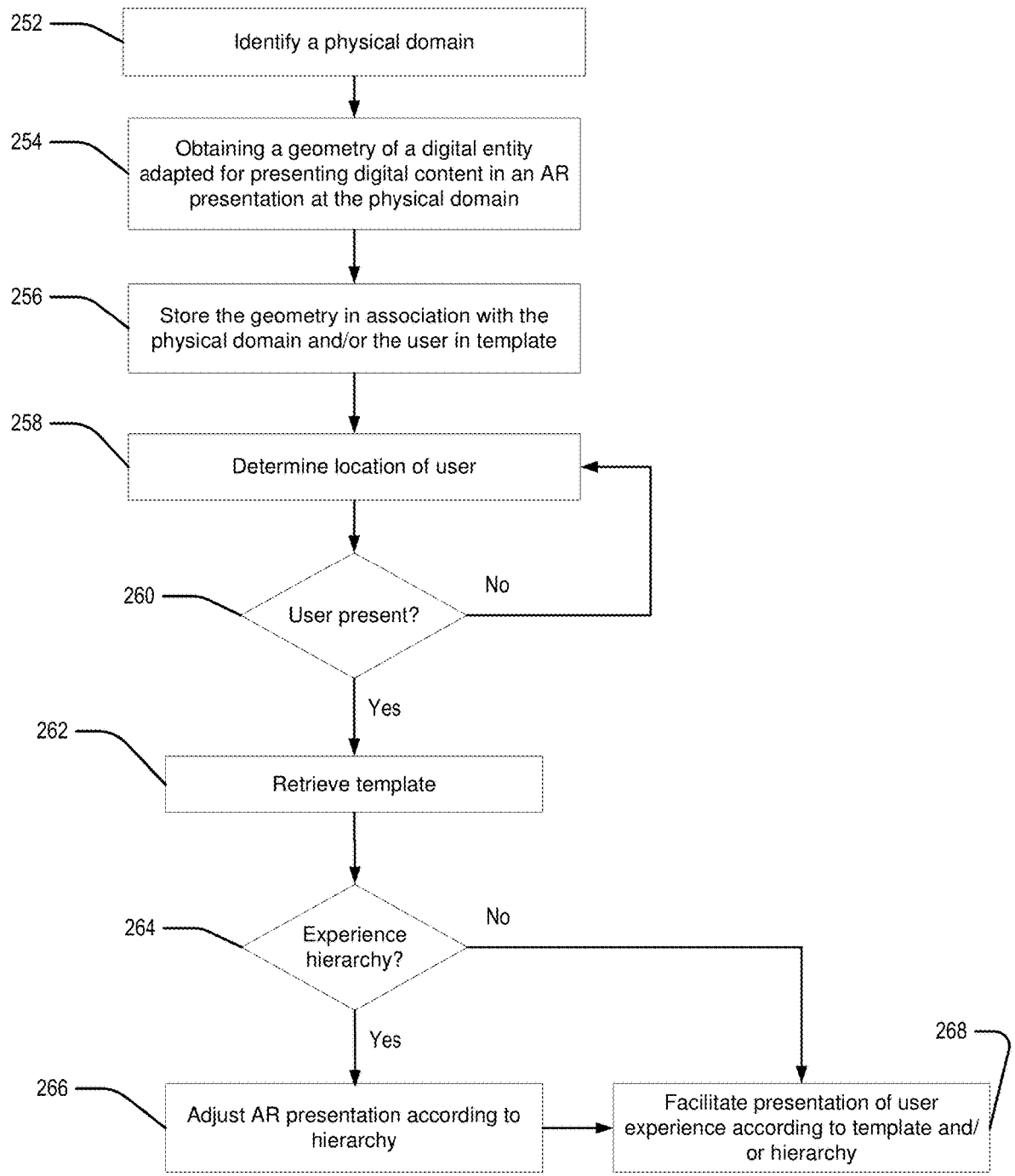
FIG. 2G depicts an illustrative embodiment of a process in accordance with various aspects described herein.

FIG. 2G depicts an illustrative embodiment of a process 250 in accordance with various aspects described herein. The process 250 is adapted to facilitate in whole or in part creation, management and/or implementation of AR templates that provide a capability to persist digital consumption experiences that users finds unique to themselves and their physical environments or surroundings, allowing users to come back to or otherwise return to those experiences time and time again. According to the process 250, physical domain is identified at 252. The physical domain can include, without limitation, a specific location, e.g., a geo-location, a specific environment, e.g., a particular classroom, a particular office space or office conference room, a particular living room, and the like. Alternatively or in addition, the physical domain can include a class of environments, e.g., a classroom, an office, a conference room, a living room, a hotel room, and so on.

A geometry of a digital entity adapted for presenting digital content within an AR presentation at the physical domain is obtained at 254. The geometry can include a size, shape, order, location of a digital entity, such as a digital TV screen, a digital picture, a digital book, a digital e-commerce experience, and the like. The geometry can include a location of the digital entity in relation to the user, e.g., relative to the user, and/or in relation to one or more objects within the physical domain. For example, the geometry can identify placement of a digital entity, i.e., TV screen, on a surface of an object within the physical domain.

The geometry is stored according to a template, in association with one or more of the user and the physical location and/or domain at 256. At least some forms of storage include template arrays that identify a digital entity according to one or more vertices of the geometry, e.g., a polygon corresponding to the virtual TV screen.

A location of equipment of a user is determined at 258. The location can be determined in any suitable manner, such determination of a geolocation of equipment of a user, e.g., according to a GPS receiver. The location, once determined, can be correlated with a physical environment, such as a user's home, office, shopping mall, and the like. Alternatively or in addition, a location of the equipment of the user can be discerned from sensory data obtained from equipment of the user. Sensory data can include position, altitude, orientation, movement, proximity to other devices, e.g., as determined according to sonar, image processing, and the like. For example, a user takes a photograph of their physical environment and their location is determined or otherwise estimated according pattern recognition applied to an image captured from the photograph.

In at least some embodiments, the user's location can be determined according to a user's schedule, proximity to other sensors, wireless access points, cell towers, other users, near field sensors, and so on.

A determination is made at 260 as to whether the equipment of the user is present at or within the identified physical domain, e.g., the equipment location is within a zone or range associated with the environment, patterns and objects discerned from imagery correlate to the environment and so on. To the extent the equipment of the user is not present, the process 250 continues to monitor a location of the user at 258 and comparing the monitored location to the physical domain. To the extent it is determined at 260 that the equipment of the user is present at the or within the identified physical domain, the process 250 retrieves a template at 262.

In some embodiments, the template facilitates a presentation of a user experience according to the template, e.g., at 268. In other embodiments a determination is made at 264 as to whether an experience hierarchy exists in relation to one or more of the user and the identified physical domain. To the extent an experience hierarchy does not exist, the template facilitates a presentation of a user experience according to the template at 268. However, to the extent it is determined at 264 that an experience hierarch does exist, the process 250 adjusts an AR presentation at the equipment of the user according to the hierarchy at 266 and facilitates a presentation of the user experience according to the adjusted AR presentation at 268.

AR templates allow AR experiences to be saved for later retrieval, playback and/or sharing. The AR templates can include one or more arrays of content, mapped or otherwise configured to a defined geometry. As a user's physical domain changes, one or more geometries within an AR presentation of the physical domain change according to one or more defined and/or otherwise determinable attributes that can include predefined, predetermined domains. The geometries can include one or more attributes such as dimensions, relativity of spacing between objects, associated content and/or content sources, priorities and so on. The AR application allows a user to characterize their routines into time periods in which the user typically engages in one or more activities, often in a repeatable or predictable manner. At certain times, and when the user is in certain physical areas, the user can access an AR template that facilitates an AR presentation of a scene of the physical area according to the AR template. The stored arrays allow an experience to persist for user in manner in which the experiences can be summoned according to the templates to assist the user according to their daily activities.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of the AR application management system 100, including the communications network 125, the subsystems and functions of system components and features 200, 210, 215, 220, 230, 240 and method process presented in FIGS. 1, 2A, 2B, 2C, 2D, 2D, 2F, 2G and 3. For example, virtualized communication network 300 can facilitate in whole or in part creation, management and/or implementation of AR templates that provide a capability to persist digital consumption experiences that users finds unique to themselves and their physical environments or surroundings, allowing users to come back to or otherwise return to those experiences time and time again.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
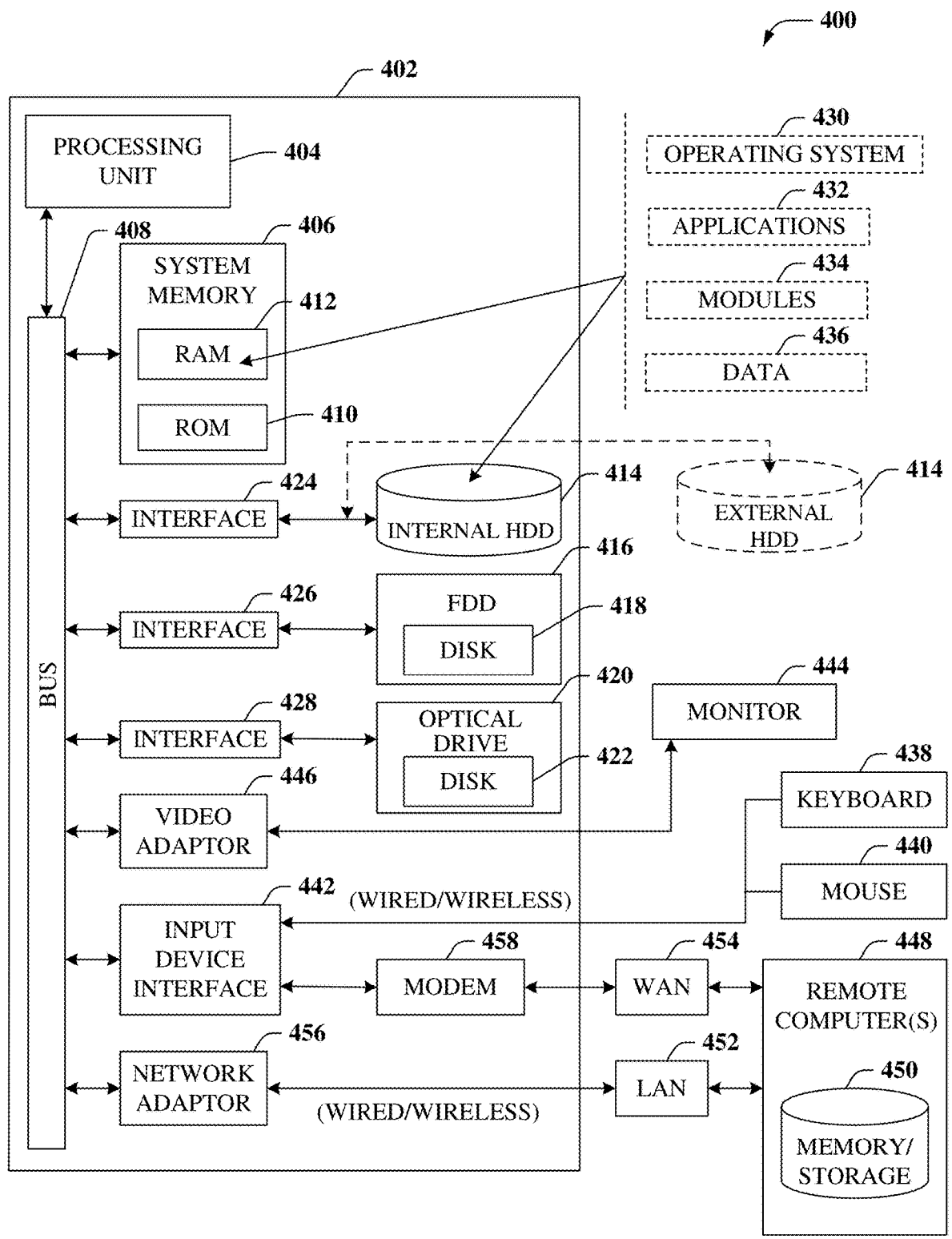
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part creation, management and/or implementation of AR templates that provide a capability to persist digital consumption experiences that users finds unique to themselves and their physical environments or surroundings, allowing users to come back to or otherwise return to those experiences time and time again.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
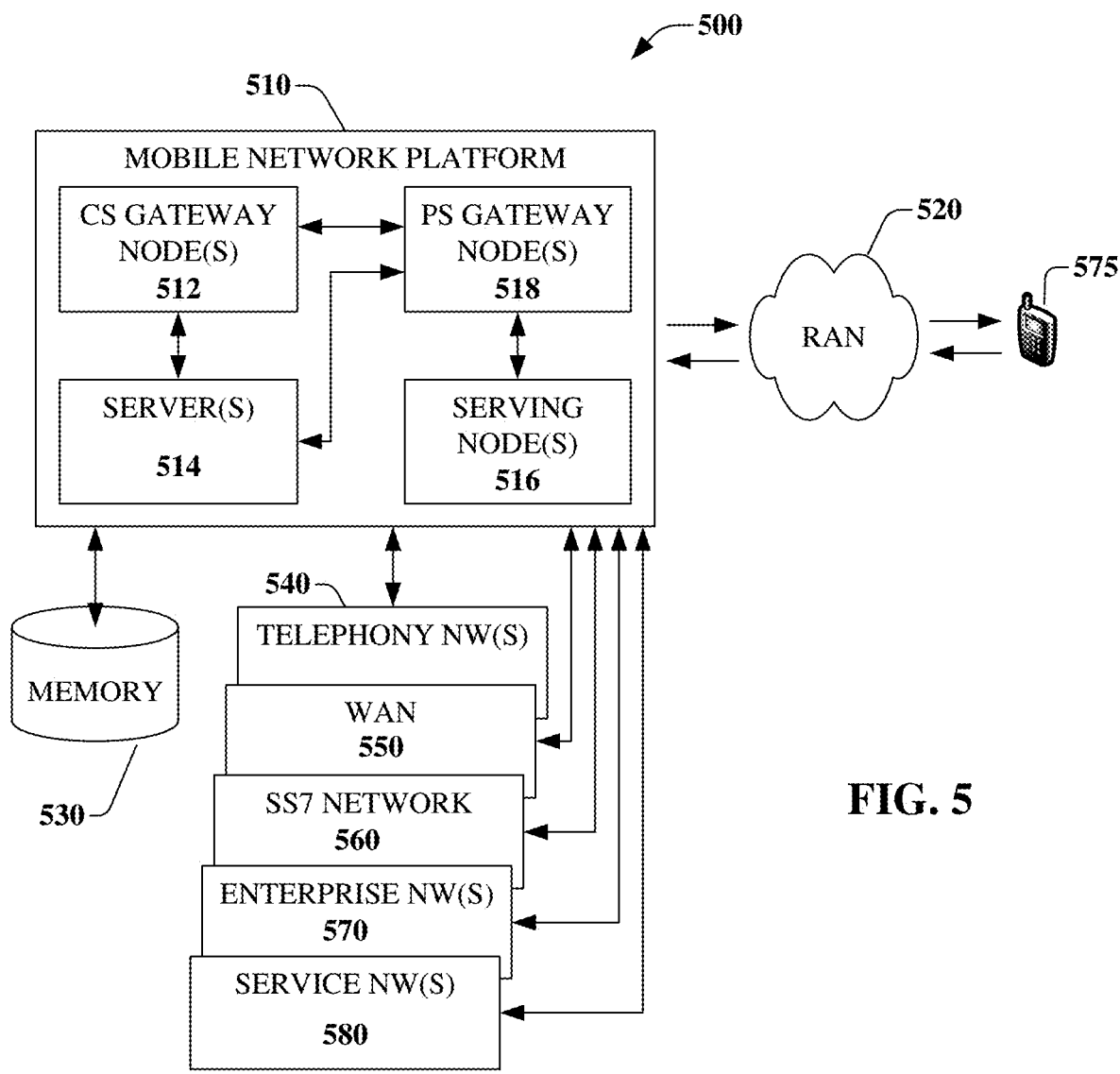
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part creation, management and/or implementation of AR templates that provide a capability to persist digital consumption experiences that users finds unique to themselves and their physical environments or surroundings, allowing users to come back to or otherwise return to those experiences time and time again. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
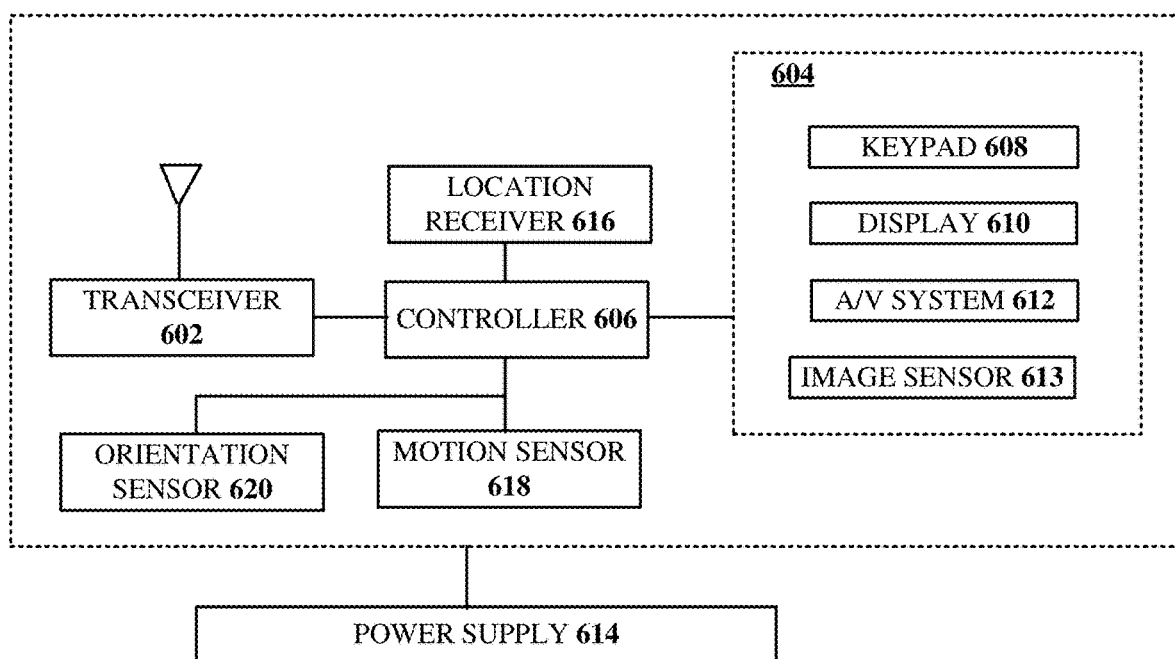
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part creation, management and/or implementation of AR templates that provide a capability to persist digital consumption experiences that users finds unique to themselves and their physical environments or surroundings, allowing users to come back to or otherwise return to those experiences time and time again.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In some embodiments, an AR application is adapted to provide recommendations for experiences in which digital content is consumed in an AR presentation of a physical space. Without limitation, recommendations can include positive reinforcement prompting a user to move to different physical space in order to access a preferred experience. In some applications, such experiences and recommendations can be developed to induce a preferred behavior in an individual, e.g., getting a person to exercise more regularly, to better focus on their work, to spend more time outdoors, and the like. Recommendations may also suggest that a user to change, e.g., add, remove, switch consumed digital content. Likewise, recommendations can include negative reinforcement presenting a user with certain experiences that prompt a user to move to a different location and/or engage in a different behavior.

In some embodiments, a backend server and/or process can be implemented to identify most common element in a 3D pixel plane, to save the identified common elements in a persistent manner and in at least some instances, to provide recommendation for a digital content and/or service. For example, when a user enters a location in which they enjoyed past experiences, they may be provided with recommend content based on their past experiences.

In some instances a selective caching strategy can be employed to anticipate a demand for particular content, e.g., streaming content, based on one or more of a user's location, a user's movement, e.g., predicting movement to another location associated with particular content. Selective caching can also be employed to a user remaining within a relatively stationary location, e.g., based on a user's focus. A user's focus can be determined from one or more of a user's interactivity, a user's head movement, e.g., direction of view, area of focus, body language. If a user is seated on a chair viewing digital content presented on a first wall in front of the user, there is no particular need to access, e.g., stream content for another digital entity, such as a second virtual TV screen defined on an opposite wall positioned behind the user. However if the user turns their head, or moves to a different position within the room in which it is likely the second virtual TV will be viewable, then digital content associated with the second virtual TV can be cached in anticipation of it's rendering in an updated AR rendering of the physical environment. Thus, digital entities may be set as active automatically, employing logical prebuffers as a head pose becomes close to a digital entity or object in the physical environment associated with the digital entity. For example, a cloud service provider may choose to download the user array and pre-buffer content. As the user looks away, local on-device storage may be freed up for other experiences. Only access, download or otherwise present digital content when it appears within, or is likely to imminently appear within the FoV.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
preconfiguring a network-accessible augmented reality (AR) template according to a curated grouping of digital content to obtain a preconfigured AR template;
determining a physical domain;
obtaining a geometry of a digital entity adapted for presenting digital content within a rendered display of the physical domain according to the geometry;
storing the geometry of the digital entity in association with the physical domain to obtain a stored geometry;
detecting a location of equipment of a user;
associating the location of the equipment of the user with the physical domain to obtain an association;
scaling the preconfigured AR template according to the stored geometry and the location of the equipment to obtain a scaled, preconfigured AR template; and
responsive to the association, providing the scaled, preconfigured AR template to the equipment of the user, the equipment of the user presenting the curated grouping of digital content within the rendered display of the physical domain according to the scaled, preconfigured AR template.

2. The device of claim 1, wherein the detecting of the location of the equipment of the user further comprises identifying a physical location of the equipment of the user, and wherein the associating of the location of the equipment of the user with the physical domain is according to the physical location of the equipment, and wherein the preconfiguring of the network-accessible AR template further comprises recording a journey of the equipment of the user through the physical domain, wherein the journey comprises a grouping and spatial placement of the digital content in relation to the physical domain.

3. The device of claim 2, wherein the physical location of the equipment comprises a geolocation according to a geographic coordinate system, and wherein the network-accessible AR template comprises a template array, that when preconfigured is adapted to define a plurality of different digital AR experiences within a single pixel space in a physical environment.

4. The device of claim 2, wherein the operations further comprise:
interpreting sensory data obtained by the equipment of the user, the location of the equipment of the user determined according to the sensory data.

5. The device of claim 4, wherein the sensory data comprises an image obtained by an image sensor of the equipment of the user, the interpreting of the sensory data further comprising:
identifying a physical feature portrayed in the image; and
correlating the image with the physical location of the equipment according to the physical feature.

6. The device of claim 5, wherein the physical domain and the physical location of the equipment are different.

7. The device of claim 1, wherein the determining the location of the equipment of the user further comprises interpreting an image obtained at the physical domain.

8. The device of claim 1, wherein the geometry of the digital entity is predetermined according to a preference of the user.

9. The device of claim 1, wherein the operations further comprise associating a digital content source with the scaled, preconfigured AR template of the digital entity.

10. The device of claim 9, wherein the digital content comprising streaming content obtainable via the digital content source.

11. A method, comprising:
preconfiguring, by a processing system including a processor, a network-accessible augmented reality (AR) template according to a curated grouping of digital content to obtain a preconfigured AR template;
determining, by flail the processing system, a physical domain;
obtaining, by the processing system, a geometry of a digital entity adapted for presenting digital content within a rendered display of the physical domain according to the geometry;
storing, by the processing system, the geometry of the digital entity in association with the physical domain to obtain a stored geometry;
determining, by the processing system, a location of equipment of a user;
associating, by the processing system, the location of the equipment of the user with the physical domain to obtain an association;
scaling, by the processor, the preconfigured AR template according to the stored geometry and the location of the equipment of the user to obtain a scaled, preconfigured AR template; and
responsive to the association, providing, by the processing system, the scaled AR template to the equipment of the user, the equipment of the user presenting the curated grouping of digital content within the rendered display of the physical domain according to the scaled, preconfigured AR template.

12. The method of claim 11, wherein the determining of the location of the equipment of the user further comprises determining, by the processing system a physical location of the equipment of the user, and wherein the associating of the location of the equipment of the user with the physical domain is according to the physical location of the equipment.

13. The method of claim 12, wherein the physical location of the equipment is determined according to a geographic coordinate system.

14. The method of claim 12, further comprising:
interpreting, by the processing system, sensory data obtained by the equipment of the user, the location of the equipment of the user determined according to the sensory data.

15. The method of claim 14, wherein the sensory data comprises an image obtained by an image sensor of the equipment of the user, the interpreting of the sensory data further comprising:
identifying, by a sensory system, a physical feature portrayed in the image; and correlating the image with the physical location of the equipment according to the physical feature.

16. A non-transitory, machine-readable medium, comprising executable instructions that, when executed by a processing system including a processor, facilitate performance of operations, the operations comprising:

preconfiguring a network-accessible augmented reality (AR) template according to a curated grouping of digital content to obtain a preconfigured AR template;
identifying a physical domain;
identifying a geometry of a digital entity adapted for presenting digital content within a rendered display of the physical domain according to the geometry;
storing the geometry of the digital entity in association with the physical domain to obtain a stored geometry;
determining a location of equipment of a user;
associating the location of the equipment of the user with the physical domain to obtain an association;
scaling the preconfigured AR template according to the stored geometry and the location of the equipment of the user to obtain a scaled, preconfigured AR template; and
responsive to the association, providing the scaled, preconfigured AR template to the equipment of the user, the equipment of the user presenting the curated grouping of digital content within the rendered display of the physical domain according to the scaled, preconfigured AR template.

17. The non-transitory, machine-readable medium of claim 16, wherein the determining of the location of the equipment of the user further comprises determining a physical location of the equipment of the user, and wherein the associating of the location of the equipment of the user with the physical domain is according to the physical location of the equipment.

18. The non-transitory, machine-readable medium of claim 17, wherein the physical location of the equipment is determined according to a geographic coordinate system.

19. The non-transitory, machine-readable medium of claim 17, wherein the operations further comprise:
interpreting sensory data obtained by the equipment of the user, the location of the equipment of the user determined according to the sensory data.

20. The non-transitory, machine-readable medium of claim 19, wherein the sensory data comprises an image obtained by an image sensor of the equipment of the user, the interpreting of the sensory data further comprising:
identifying a physical feature portrayed in the image; and
correlating the image with the physical location of the equipment according to the physical feature.

* * * * *